(12) United States Patent
Block

(10) Patent No.: US 12,024,288 B2
(45) Date of Patent: Jul. 2, 2024

(54) FAILSAFE DETERMINATE FLAP SUPPORT UNDERWING ATTACHMENT

(71) Applicant: The Boeing Company, Chicago, IL (US)

(72) Inventor: Samuel L. Block, Bothell, WA (US)

(73) Assignee: THE BOEING COMPANY, Arlington, VA (US)

( * ) Notice: Subject to any disclaimer, the term of this patent is extended or adjusted under 35 U.S.C. 154(b) by 211 days.

(21) Appl. No.: 17/853,634

(22) Filed: Jun. 29, 2022

(65) Prior Publication Data

US 2024/0002037 A1  Jan. 4, 2024

(51) Int. Cl.
*B64C 9/02* (2006.01)
*B64C 3/18* (2006.01)
*B64C 9/18* (2006.01)

(52) U.S. Cl.
CPC ............ *B64C 9/02* (2013.01); *B64C 3/18* (2013.01); *B64C 9/18* (2013.01)

(58) Field of Classification Search
CPC .................................................... B64C 9/02
See application file for complete search history.

(56) References Cited

U.S. PATENT DOCUMENTS

| | | | |
|---|---|---|---|
| 4,183,121 A | | 1/1980 | Cousins |
| 4,840,331 A | * | 6/1989 | Williams ............... B64C 9/16 244/212 |
| 4,989,774 A | * | 2/1991 | Stephen ............... B64C 1/06 29/889.72 |
| 6,843,449 B1 | * | 1/2005 | Manteiga ............... B64D 27/40 244/54 |
| 9,227,722 B2 | * | 1/2016 | Soenarjo ............... B64C 3/50 |
| 9,889,922 B2 | | 2/2018 | Soenarjo |
| 10,946,949 B2 | | 3/2021 | Tsai et al. |
| 11,161,594 B2 | | 11/2021 | Tsai et al. |
| 11,427,301 B2 | * | 8/2022 | Tsai ............... B64C 13/30 |
| 11,591,067 B2 | * | 2/2023 | Tsai ............... B64C 9/16 |
| 11,623,734 B2 | * | 4/2023 | Glassmoyer ............... B64C 9/02 244/213 |

(Continued)

OTHER PUBLICATIONS

Rusanu, Irina, Extended European Search Report issued Nov. 6, 2023 in corresponding European Application No. 23179507.1, 6 pages.

*Primary Examiner* — Joshua J Michener
*Assistant Examiner* — Michael B. Kreiner
(74) *Attorney, Agent, or Firm* — MH2 Technology Law Group LLP

(57) ABSTRACT

An underwing flap support mounting structure is disclosed that includes an underwing beam comprising an integral clevis at a forward end of the underwing beam and mounted to a lower skin of a wingbox, wherein the integral clevis comprises a first clevis bore and second clevis bore; and a wingbox lug fitting comprising a wingbox lug and a spherical bearing support assembly carrying a race and a spherical bearing, the wingbox lug having a wingbox lug bore and the spherical bearing having a spherical bearing bore, wherein a forward-aft oriented fuse pin is slidably received in the spherical bearing bore, the first clevis bore, and the second clevis bore to inhibit relative linear-vertical motion of the underwing beam and the integral clevis relative to a wingbox lug fitting that is mounted to the lower skin of the wingbox.

20 Claims, 13 Drawing Sheets

(56) References Cited

U.S. PATENT DOCUMENTS

| | | | |
|---|---|---|---|
| 2009/0127403 A1* | 5/2009 | Perez-Sanchez | B64C 9/22 244/131 |
| 2020/0115033 A1 | 4/2020 | Tsai et al. | |
| 2021/0061441 A1 | 3/2021 | Gruner et al. | |
| 2021/0086904 A1 | 3/2021 | Tsai et al. | |

* cited by examiner

FAILSAFE DETERMINATE FLAP SUPPORT UNDERWING ATTACHMENT

FIELD

Implementations of the disclosure relate generally to structural systems for aircraft and, more particularly, an underwing flap support structure with fusing elements to allow separation of the structure from the wing upon ground contact of the flap or structure.

BACKGROUND

Commercial aircraft typically employ wing flaps that are downwardly extendible from the wings. The flaps and supporting structure may contact the ground during certain operational scenarios such as a wheels up landing. The wing flap structure typically is connected directly to or in proximity of structural elements of the wing and minimizing any damage to the main wing structure resulting from ground contact by the flaps is desirable.

Thus, a heretofore unaddressed need exists in the industry to address the aforementioned deficiencies and inadequacies, and in particular, for higher performing, e.g., lower weight, drag, cost, structural joints.

SUMMARY

According to examples of the present disclosure, an underwing flap support mounting structure is disclosed and comprises a one-piece underwing beam comprising an integral clevis at a forward end of the one-piece underwing beam and mounted to a lower skin of a wingbox, wherein the integral clevis comprises a first clevis bore and second clevis bore; and a wingbox lug fitting comprising a wingbox lug and a spherical bearing support assembly carrying a race and a spherical bearing, the wingbox lug having a wingbox lug bore and the spherical bearing having a spherical bearing bore, wherein a forward-aft oriented fuse pin is slidably received in the spherical bearing bore, the first clevis bore, and the second clevis bore to inhibit relative linear-vertical motion of the one-piece underwing beam and the integral clevis relative to a wingbox lug fitting that is mounted to the lower skin of the wingbox, wherein a force applied to an aft portion of the underwing beam that is sufficient to urge separation from the wingbox creates a moment inducing the one-piece underwing beam to apply a shear force to enable the one-piece underwing beam and the integral clevis to pivot, shear the forward-aft oriented fuse pin, and enable the one piece underwing beam to become detached, whereby the underwing beam separates from a wing without resulting damage to an underside of a wing structure.

The underwing flap support mounting structure can include one or more of the following features. The underwing flap support mounting structure further comprises attachment brackets attaching the one-piece underwing beam to a rear spar extending upward from the lower wing skin. The wingbox lug fitting comprising an attachment plate secured to the fixed wing structure. The underwing flap support mounting structure further comprises a catcher that extends from the wingbox lug fitting as a failsafe device to engage the one-piece underwing beam. The catcher extends from the wingbox lug fitting by mating attachments. The underwing flap support mounting structure further comprises bolts engaging the mating attachments to constrain the catcher. The moment further causes the one-piece underwing beam to continue to apply shear force inducing shearing of the forward-aft oriented fuse pin. The attachment brackets are attached to the underwing beam with fasteners having permanent heads or frangible heads. The force further causes the underwing beam to rotate fracturing the frangible heads thereby releasing the underwing beam from attachment brackets. A flap is attached to the underwing beam with one or more support links, said support links engaged proximate the aft portion of the underwing beam in an extended position of the flap whereby ground contact of the flap applies the force to the aft portion. The wingbox is composed of a material comprising metal or carbon.

According to examples of the present disclosure, a method for separating an underwing flap support structure upon impact is disclosed and comprises supporting a forward-aft oriented fuse pin extending from a lug in a spherical bearing; engaging an integral clevis in a one-piece underwing beam on a forward end of an underwing beam mounted in a wing; applying a force to an aft portion of the underwing beam that is sufficient to urge separation from the wing; applying a shear force with the one-piece underwing beam to shear the forward-aft oriented fuse pin engaging the one-piece underwing beam and the integral clevis; rotating the integral clevis of the underwing beam; and releasing a forward end of the underwing beam for continued rotation.

The method for separating an underwing flap support structure upon impact can include one or more of the following features. The method further comprises in response to a failure of the forward-aft oriented fuse pin, rotating the underwing beam from an operational position to a first position; contacting the one-piece underwing beam on a catcher; and supporting the one-piece underwing beam with the catcher in a failsafe position. The method further comprises shearing secondary bolts securing a catcher to mating flanges from a plate engaged to the wingbox lug fitting; releasing the catcher; and allowing the underwing beam to continue rotation. The method further comprises rotating the underwing beam about rear spar attachment brackets. The method further comprises reducing damage to an underside of a wing structure, rear spar and associated integral fuel cell by the attachment brackets remaining attached to the rear spar and the spherical bearing support assembly remaining attached to the fixed wing structure. A flap is attached to the underwing beam with one or more support links and further comprising: engaging the support links proximate the aft portion of the underwing beam in an extended position of the flap; and contacting the flap on a ground surface to apply the force to the aft portion.

According to examples of the present disclosure, an airplane is disclosed that comprises a wing; an underwing flap support mounting structure mounted to the wing, wherein the underwing flap support mounting structure comprises: a one-piece underwing beam comprising an integral clevis at a forward end of the one-piece underwing beam and mounted to a lower skin of a wingbox, wherein the integral clevis comprises a first clevis bore and second clevis bore; and a wingbox lug fitting comprising a wingbox lug and a spherical bearing support assembly carrying a race and a spherical bearing, the wingbox lug having a wingbox lug bore and the spherical bearing having a spherical bearing bore, wherein a forward-aft oriented fuse pin is slidably received in the spherical bearing bore, the first clevis bore, and the second clevis bore to inhibit relative linear-vertical motion of the one-piece underwing beam and the integral clevis relative to a wingbox lug fitting that is mounted to the lower skin of the wingbox, wherein a force applied to an aft portion of the underwing beam that is sufficient to urge separation from the wingbox creates a moment inducing the one-piece underwing beam to apply a shear force to enable the one-piece underwing beam and the integral clevis to pivot, shear the forward-aft oriented fuse pin, and enable the one piece underwing beam to become detached, whereby the underwing beam separates from the wing without resulting damage to an underside of a wing structure.

The airplane can include one or more of the following features. The airplane further comprises attachment brackets attaching the one-piece underwing beam to a rear spar extending upward from the lower wing skin. The moment further causes the one-piece underwing beam to continue to apply shear force inducing shearing of the forward-aft oriented fuse pin.

BRIEF DESCRIPTION OF THE DRAWINGS

The accompanying drawings, which are incorporated in and constitute a part of this specification, illustrate embodiments of the present teachings and together with the description, serve to explain the principles of the disclosure.

DETAILED DESCRIPTION

Figure 1A:
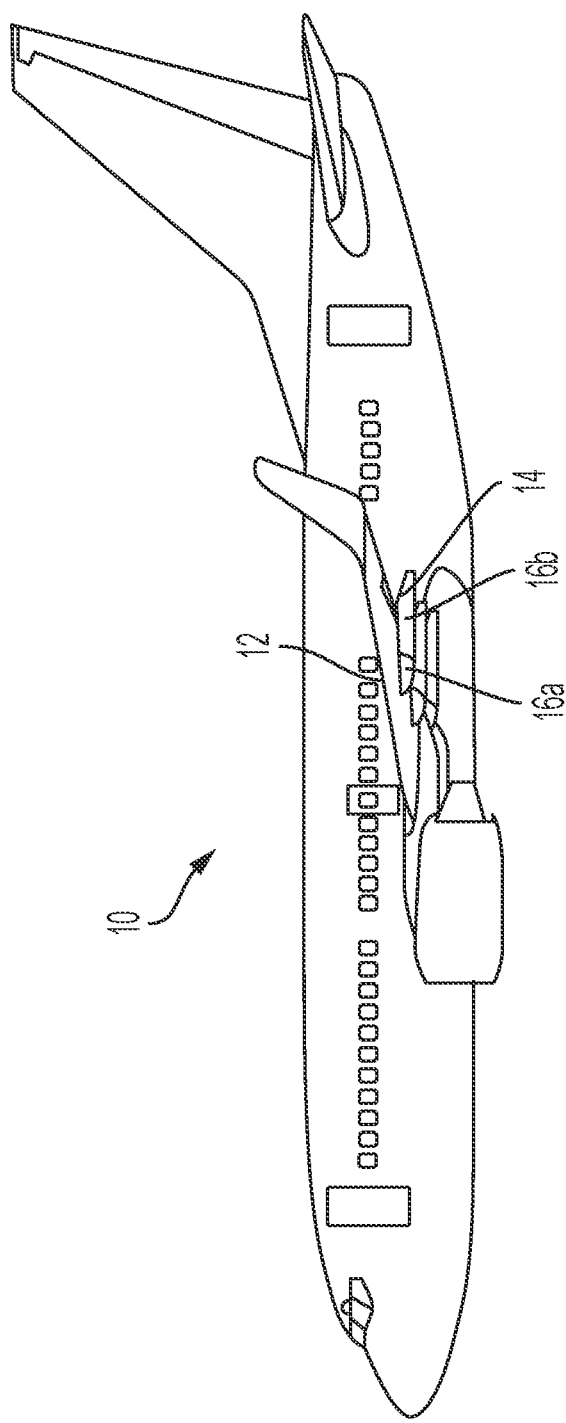
FIG. 1A is a representation of an aircraft in which the implementations disclosed herein may be employed.

Reference will now be made in detail to the present embodiments, examples of which are illustrated in the accompanying drawings. Wherever possible, the same reference numbers will be used throughout the drawings to refer to the same or like parts.

Generally speaking, examples of the present disclosure provide for an attachment configuration for high fowler and low fowler underwing beam designs to a wingbox that is simple to manufacture, failsafe, has determinate loads, lower cost/weight, allows for installation tolerances and part growth/shrinkage due to thermal mismatch, and requires minimal fairing volume. The attachment reduces weight, cost, and fairing volume, while attaching underwing beam to the wingbox in a manner that is statically determinate and allows for part installation tolerances and coefficient of thermal expansion (CTE) mismatch. On some aircraft, there can be difficulties installing the flap support forward attachment, as the freebody diagram is statically indeterminate. This results in necessarily conservative assumptions about load share between the forward and aft attachments, as the actual distribution is highly dependent on local stiffness. Additionally due to the indeterminacy, as the flap support flexes under load or grows/shrinks from CTE mismatch, attachment load increases unnecessarily, resulting in higher weight. The indeterminate flap support system on certain aircraft has also resulted in installation difficulties, as tolerances must be extremely tight. To resolve this, certain aircraft may need to open up the critical fuse pin joint to a looser fit, which can result in premature fatigue cracking.

The present attachment configuration for an underwing beam to the wingbox provides appropriate degrees of freedom using an axially unclamped forward-aft oriented fuse pin with a one-piece underwing beam with an integral clevis for use on small carbon fiber reinforced polymer (CFRP) wings. This combination allows for easy part integration, determinate loads, and substantial installation and thermal mismatch tolerances, while meeting failsafe requirements and lower cost/smaller fairing compared to previous designs. The present attachment configuration provides for the flap support attached to the wingbox with a forward-aft oriented fuse pin and spherical bearing, and clevis on the flap support, with a lug on the wingbox. This results in determinate loads and substantial installation tolerances as the flap support is free to slide axially along the fuse pin. Additionally, with just a lug on the wingbox side (not clevis), integration is simple and similar to existing 2×2 bolt patterns for attachment. The one-piece underwing beam is easy to machine and enables the simple wingbox integration. The integral clevis on the flap support wraps fully around the wingbox lug, providing a side load path under a fuse pin failure condition, but allowing for flap support breakaway without rupturing the fuel tank.

Accordingly, implementations disclosed herein provide an under-wing flap support mount, with a joint having a separable pin disposed in a spherical bearing, and a lug end coupled to the under-wing flap support. Any force to an aft portion of the flap support (e.g. wheels up landing) that may separate the under-wing flap support will cause a sacrificial 'fuse' pin to shear, permitting the joint pin to separate from the spherical bearing.

Figure 1B:
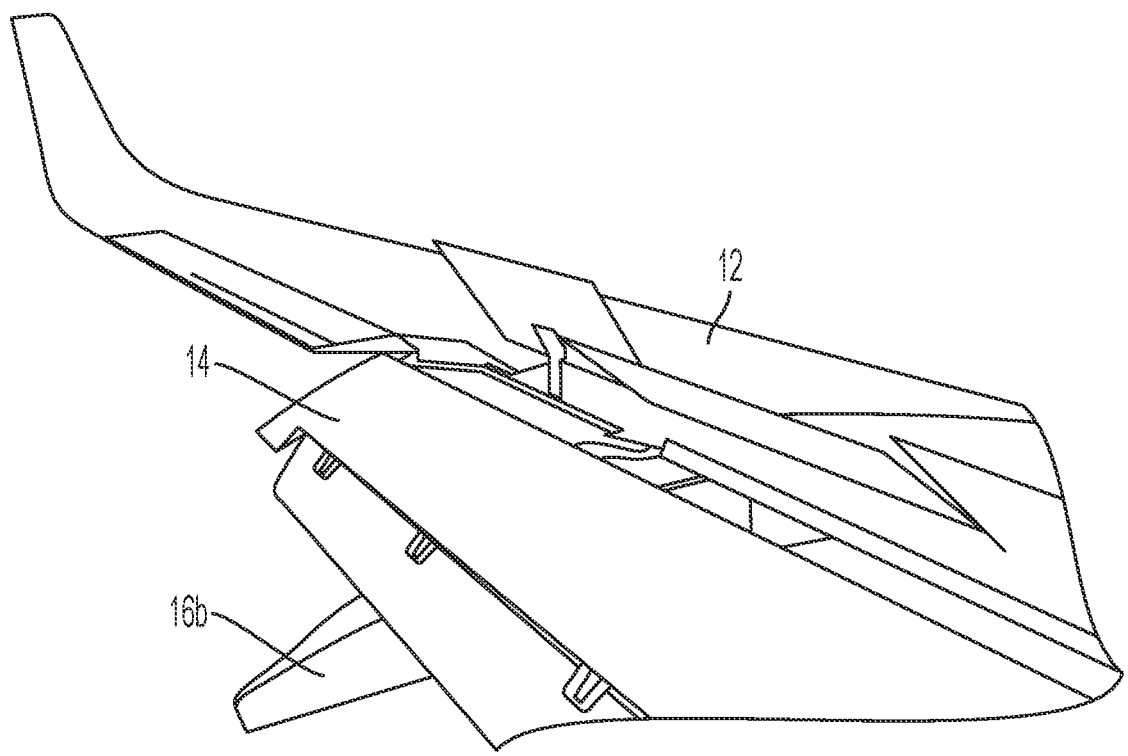
FIG. 1B is a detailed representation of the wing and flap of the aircraft of FIG. 1A.
Figure 2:
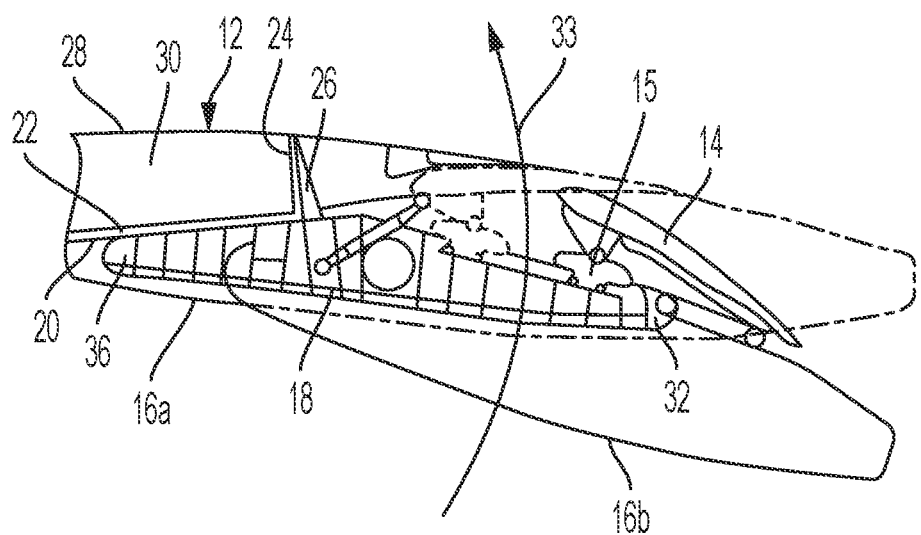
FIG. 2 is a partial section representation of the internal structure of an underwing beam (UWB) support for flaps and movable fairings in the aircraft.

Referring to the drawings, FIG. 1A and FIG. 1B depict an aircraft 10 having a wing 12 with operating flaps 14. The flaps 14 are engaged to the wing 12 at multiple attachment points with underwing structures partially housed within fixed fairings 16a and movable fairings 16b. Extension of the flaps 14 to enhance aerodynamic performance during takeoff and landing causes the flaps 14 and movable fairings 16b to rotate downward relative to the wing 12. As seen in FIG. 2, at each attachment point an underwing beam (UWB) 18 constitutes a principal element in an under-wing flap support mounting structure to attach the flaps 14 and associated operating support links 15 and actuators to the wing 12. The UWB 18 is attached to the wing 12 on a lower surface 20 formed by a wing lower skin 22 and partially housed within the fixed fairing 16a. A rear spar 24 extends upward within the wing 12 from the wing lower skin 22 and the UWB 18 is attached to the rear spar with attachment brackets 26. The attachment brackets 26 are attached to the underwing beam with fasteners having permanent heads or frangible heads. The wing lower skin 22, rear spar 24 and upper wing skin 28 form an integral fuel cell 30 within the wing. In the extended position of the flaps 14 as shown in FIG. 2 (the unextended position shown in phantom) the support links 15 are supported proximate an aft portion 32 of the UWB. During a wheels up landing, the flap 14, movable fairing 16b, and, potentially, the aft portion 32 of the UWB 18, contact the ground asserting a force causing a rotational moment 33 to be exerted on the UWB 18. The flap 14 is attached to an one-piece underwing beam 46 with one or more support links 15, the support links 15 engaged proximate the aft portion of the UWB 18 in an extended position of the flap whereby ground contact of the flap 14 applies the force to the aft portion.

Figure 3A:
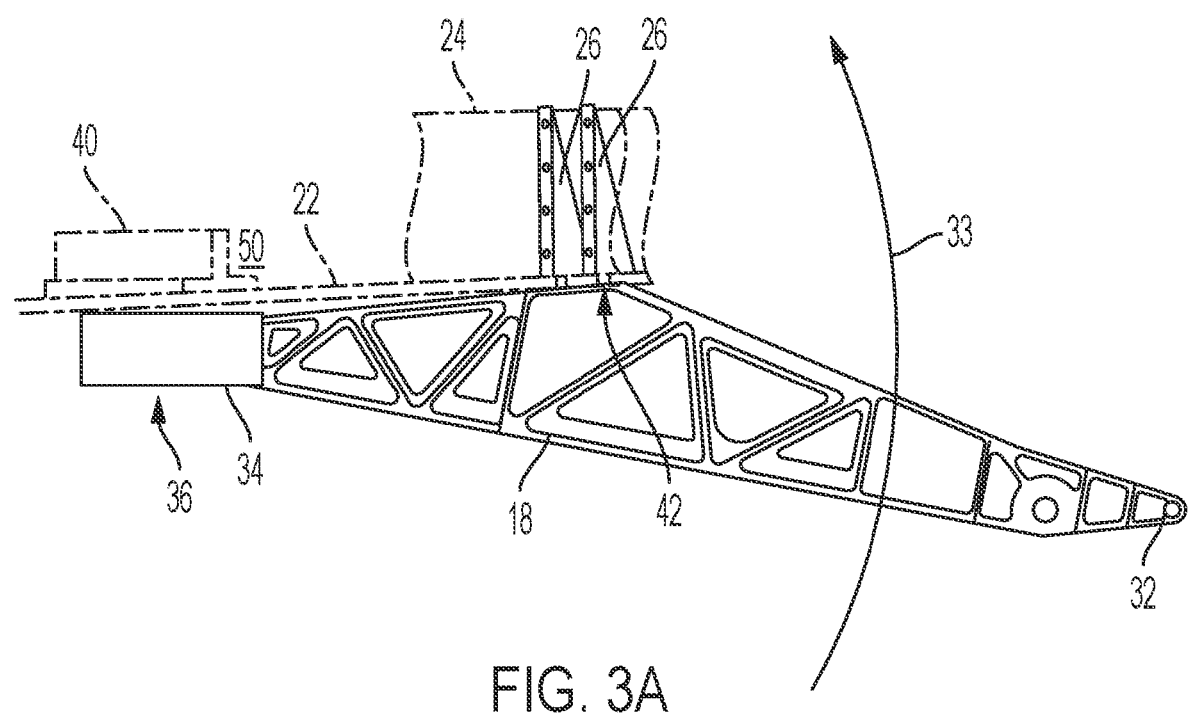
FIG. 3A is a detailed side view of the UWB and associated structure for an exemplary implementation as disclosed herein.
Figure 3B:
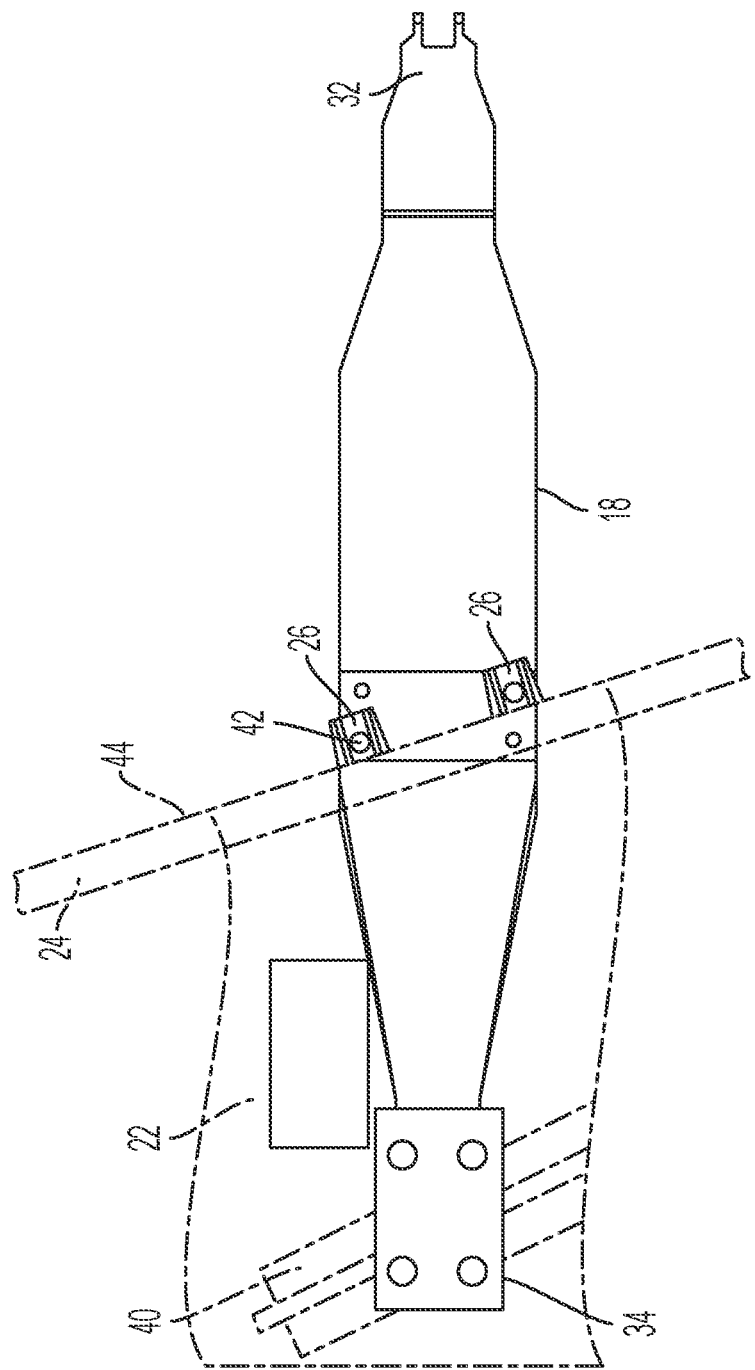
FIG. 3B is a detailed top view of the UWB and associated structure.
Figure 4A:
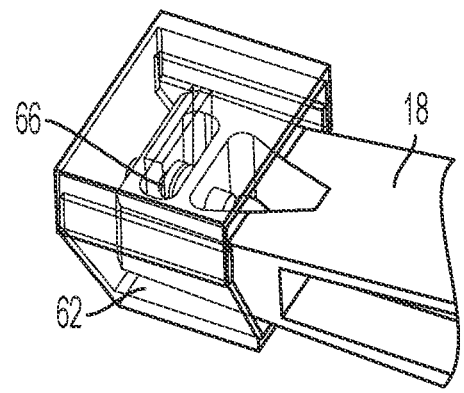
FIG. 4A is further detailed top perspective representation of the elements of the exemplary implementation for engagement of a forward end of the UWB to the wing structure.
Figure 4B:
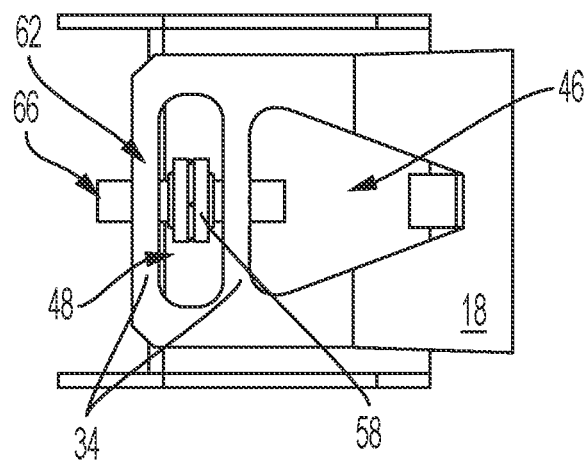
FIG. 4B is a view looking down of FIG. 4A with the wingbox lug fitting removed for clarity.
Figure 4C:
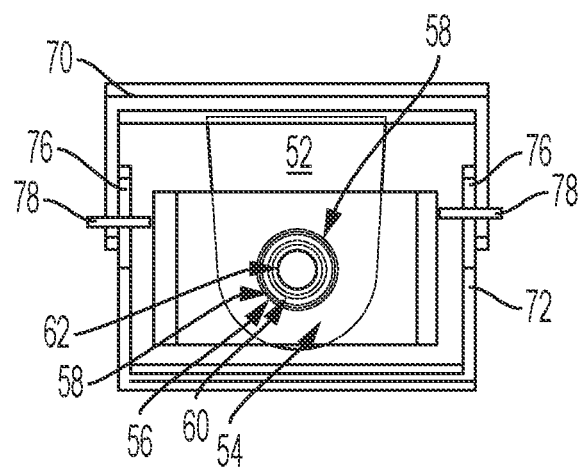
FIG. 4C is a cross-sectional representation of FIG. 4A.

A general layout of the overall structure is seen in FIGS. 3A and 3B with details shown in FIG. 4A, FIG. 4B, and FIG. 4C. The UWB 18 has an integral clevis 34 on a forward end 36 of the UWB 18. A spherical bearing support assembly carrying a spherical bearing (to be described in greater detail subsequently) is mounted to fixed wing structure 40 proximate the lower wing skin 22 (shown in phantom). The attachment brackets 26 are connected to the UWB 18 with fasteners 42, and extend upward and are attached along a rear surface 44 of the rear spar 24 (shown in phantom).

Figure 5:
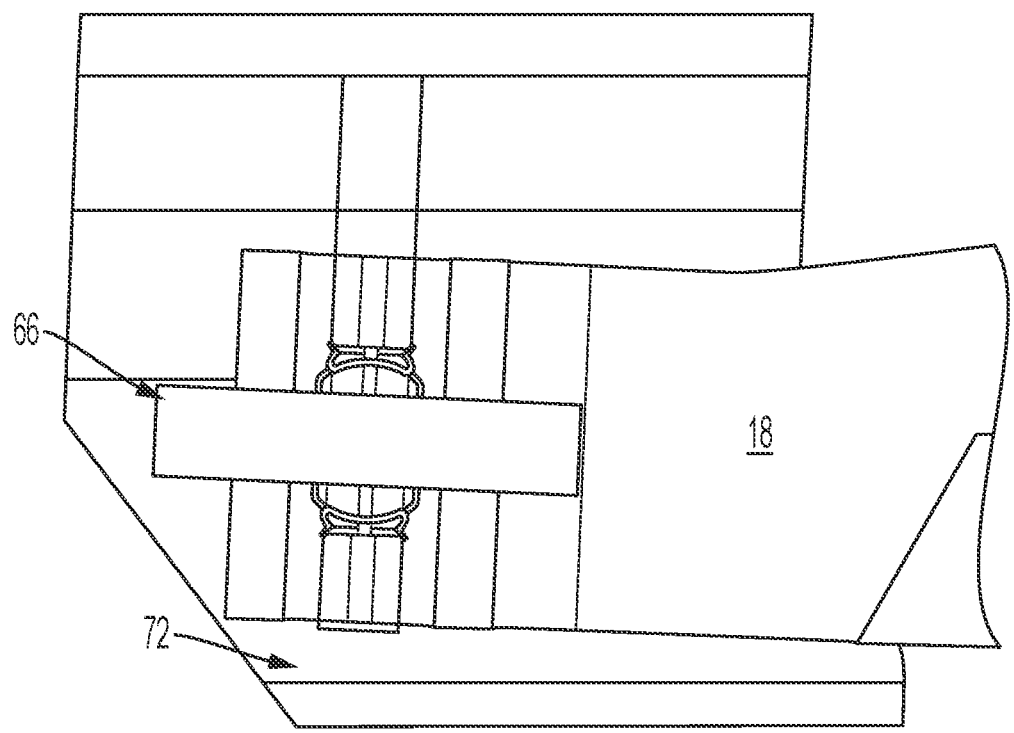
FIG. 5 shows a side view of the UWB and associated structures according to examples of the present teachings.

FIG. 4A is further detailed top perspective representation of the elements of the exemplary implementation for engagement of a forward end of the UWB to the wing structure according to examples of the present teachings. FIG. 4B is a top view representation with wingbox fitting removed for clarity of FIG. 4A with the catcher removed for clarity. FIG. 4C is a cross-sectional representation of FIG. 4A. FIG. 5 shows a side view of the UWB and associated structures according to examples of the present teachings.

As shown in greater detail in FIG. 4A, FIG. 4B, FIG. 4C, and FIG. 5, the underwing flap support mounting structure comprises the one-piece UWB 18. The UWB 18 comprises the integral clevis 34 at the forward end 36 of the UWB 18 and mounted to a lower skin 22 of a wingbox 50. The wingbox 50 is composed of a material comprising metal or carbon. The integral clevis 34 comprises a first clevis bore 46 and a second clevis bore 48.

The underwing flap support mounting structure also comprises a wingbox lug fitting 52 comprising a wingbox lug 54 and a spherical bearing support assembly 56 carrying a race 58 and a spherical bearing 60. The wingbox lug 54 has a wingbox lug bore 56 and the spherical bearing 58 has a spherical bearing bore 62. The wingbox lug fitting 52 further comprises an attachment plate 70 that is secured to the fixed wing structure 40.

A forward-aft oriented fuse pin 66 is slidably received in the spherical bearing bore 62, the first clevis bore 46, and the second clevis bore 48 to inhibit relative linear-vertical motion of the UWB 18 and the integral clevis 34 relative to a wingbox lug fitting 52 that is mounted to the lower skin 22 of the wingbox 50. The race 58 permits the forward-aft oriented fuse pin 66 and the spherical bearing 58 to pivot within the spherical bearing support assembly 56.

When a force applied to an aft portion of the UWB 18 that is sufficient to urge separation from the wing creates a moment inducing the UWB 18 to apply a shear force to enable the UWB 18 and the integral clevis 34 to pivot, shear the forward-aft oriented fuse pin 66, and enable the UWB 18 to become detached. Thus, the UWB 18 separates from the wing 12 without resulting damage to an underside of a wing structure.

The underwing flap support mounting structure further comprises attachment brackets 26 attaching the one-piece underwing beam 46 to a rear spar 24 extending upward from the lower wing skin 22. The underwing flap support mounting structure further comprises a catcher 72 that extends from the wingbox lug fitting 52 as a failsafe device to engage the UWB 18. The catcher 72 extends from the wingbox lug fitting 54 by mating attachments 76. The underwing flap support mounting structure further comprises bolts 78 engaging the mating attachments 76 to constrain the catcher 72.

Side load in the spherical bearing support assembly 56 is radial in the spherical bearing 60 (not axial), so no threaded or bolted bearing retention is required. Side load simply goes into the lug's strong axis. Under a failure condition where the forward-aft oriented fuse pin 66 fatigues and cracks, the catcher 72 takes vertical load, but the side load path again goes directly through the lug's strong axis via part-to-part contact. This combination of features results in a flap support configuration that is lower weight, lower cost, faster to install, and has shallow fairing depth.

Figure 6:
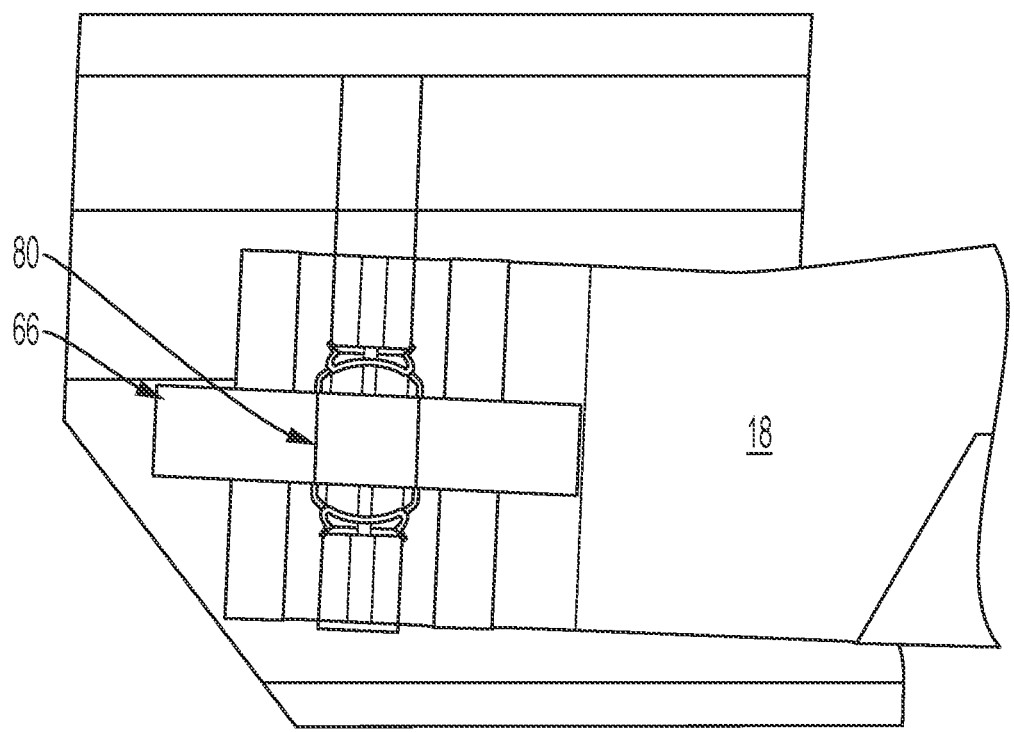
FIG. 6 shows the view of FIG. 5 with the forward-aft oriented fuse pin being initially sheared.
Figure 7:
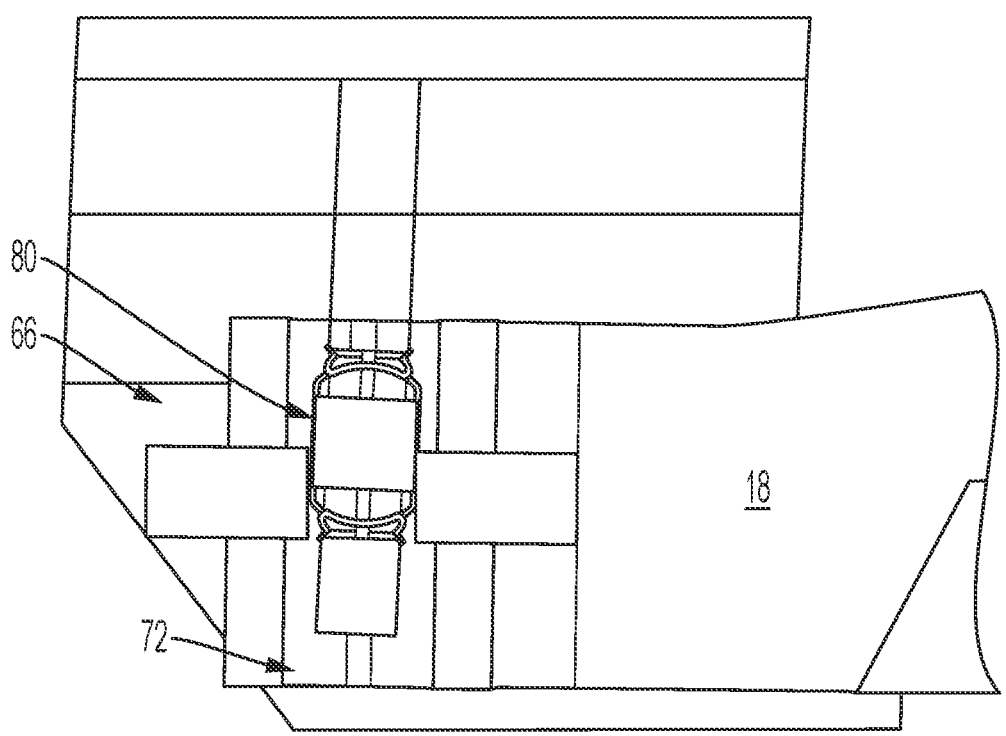
FIG. 7 shows the view of FIG. 6 as the UWB contacts the catcher.
Figure 8:
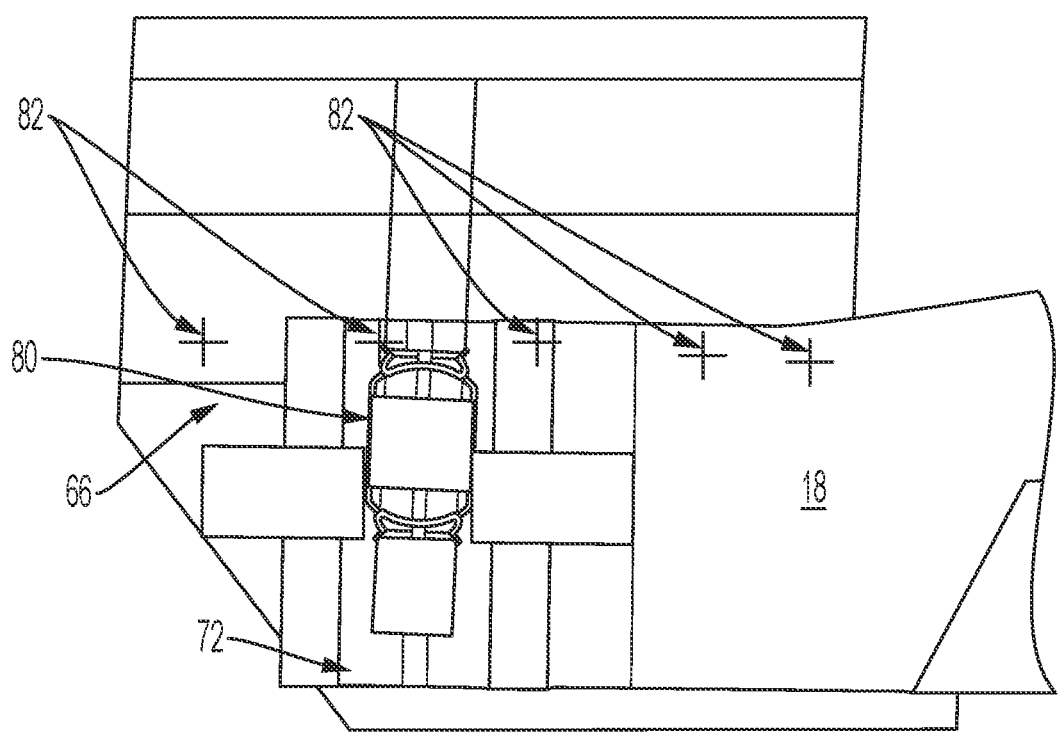
FIG. 8 shows the view of FIG. 7 as the catcher bolts common to the wingbox lug fitting flanges break.
Figure 9:
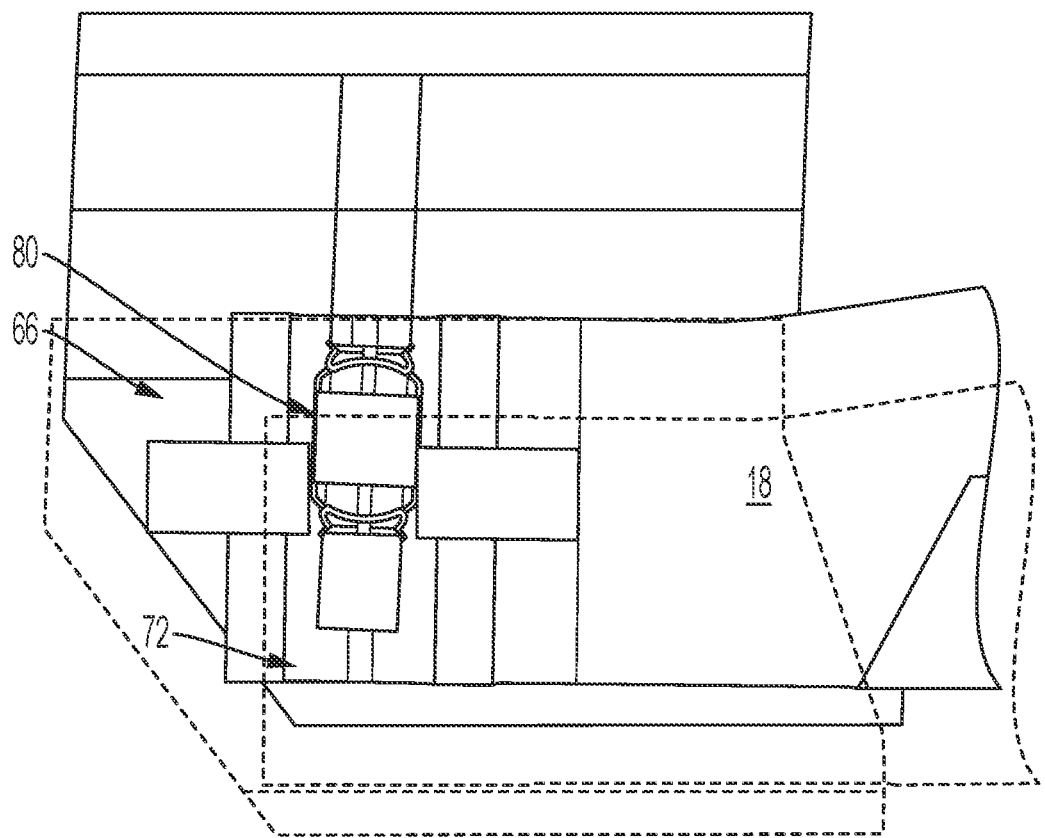
FIG. 9 shows the view of FIG. 8 as the UWB continues rotating down and pushing the catcher further out with it.

FIG. 6 shows the view of FIG. 5 with the forward-aft oriented fuse pin 66 being initially sheared at fracture line 80. FIG. 7 shows the view of FIG. 6 as the UWB 18 contacts the catcher 72. FIG. 8 shows the view of FIG. 7 as the catcher bolts 82 common to the wingbox lug fitting flanges break. FIG. 9 shows the view of FIG. 8 as the UWB 18 continues rotating down and pushing the catcher 72 further out with it.

Figure 10:
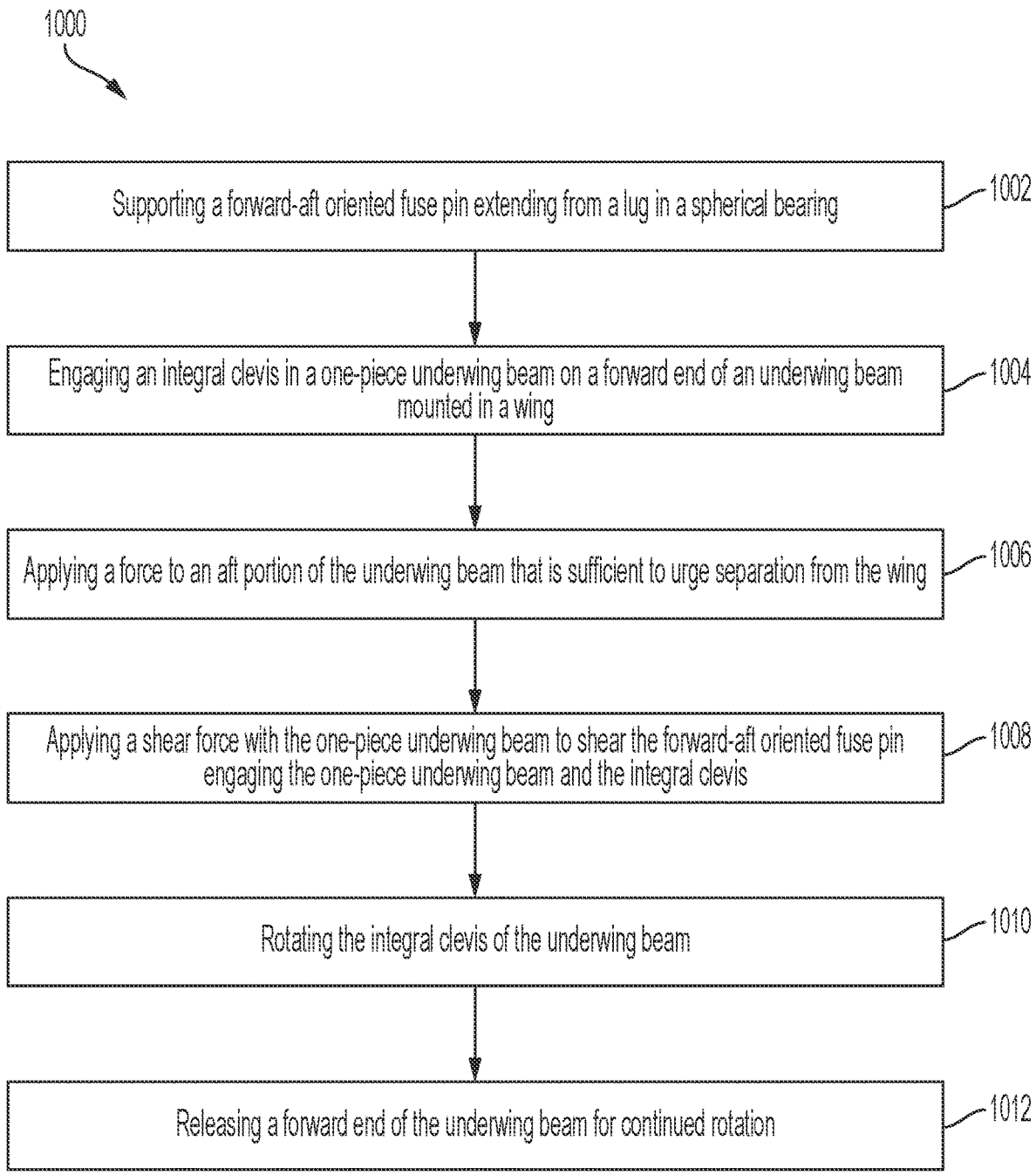
FIG. 10 shows a method for separating an underwing flap support structure upon impact according to examples of the present teachings.
Figure 10:
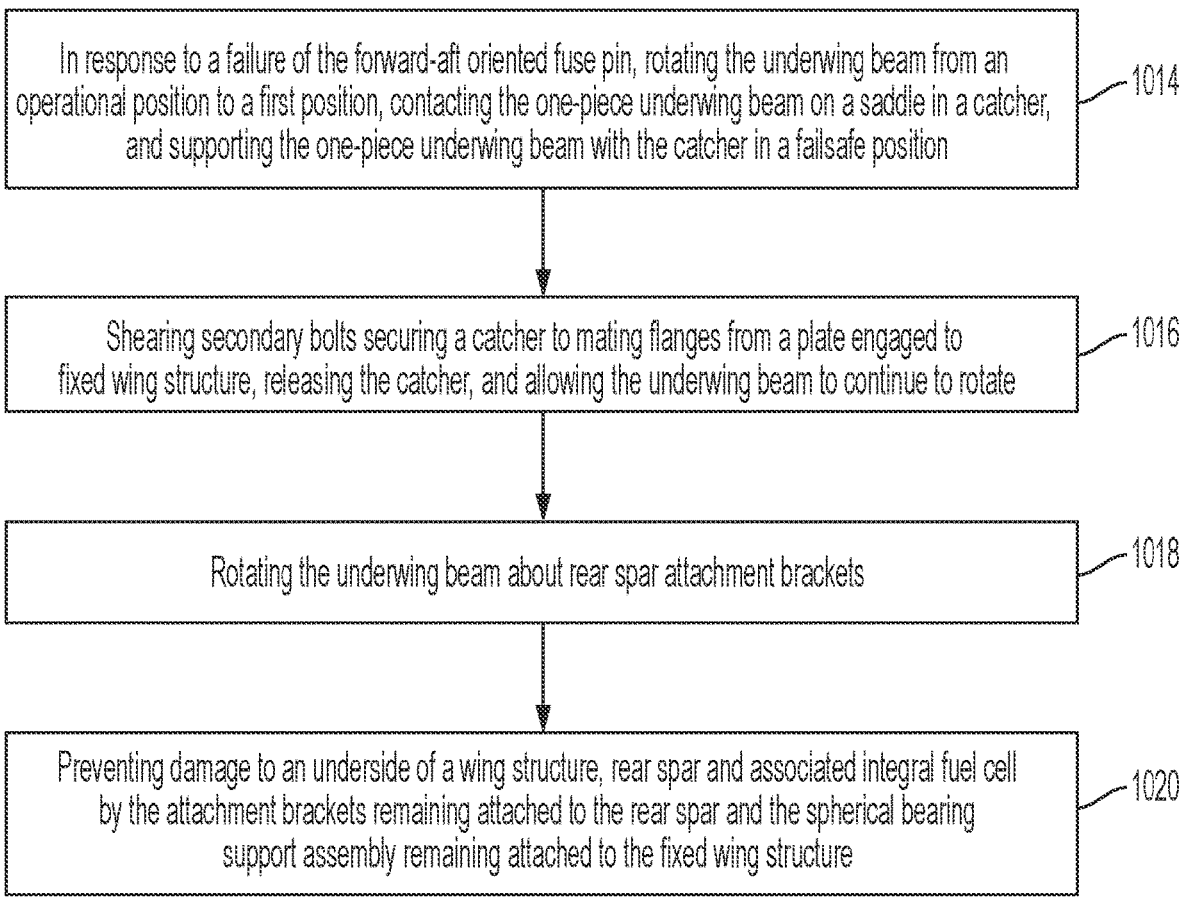

FIG. 10 shows a method 1000 for separating an underwing flap support structure upon impact according to examples of the present teachings. The method 1000 comprises supporting a forward-aft oriented fuse pin extending from a lug in a spherical bearing, as in 1002. For example, the forward-aft oriented fuse pin 66 extends from the spherical bearing 60 of the wingbox lug fitting 52. The method 1000 continues by engaging the lug in a one-piece underwing beam clevis on a forward end of an underwing beam (UWB) mounted in a wing, as in 1004. Continuing with the example, the wingbox lug fitting 52 is engaged with the UWB 18 that is mounted on the wing 12. The method 1000 continues by applying a force to an aft portion of the UWB that is sufficient to urge separation from the wing, as in 1006. The method 1000 continues by applying a shear force with the one-piece underwing beam to shear the forward-aft oriented fuse pin engaging the one-piece underwing beam and the integral clevis 34, as in 1008. As shown in FIG. 6, the forward-aft oriented fuse pin 66 shears at fracture line 80 upon sufficient shear force. The method 1000 continues by rotating the integral clevis 34 of the underwing beam, as in 1010. As shown in FIG. 7, FIG. 8, and FIG. 9, as the forward-aft oriented fuse pin 66 fractures, the catcher bolts 82 that are common to the wingbox lug fitting flanges break and the UWB 18 continues to rotate down and push the catcher 72 further out with it. The method 1000 continues by releasing a forward end of the UWB for continued rotation, as in 1012. As shown in FIG. 7, FIG. 8, and FIG. 9, the saddle bolts 82 break with continued shear force and the forward end of the UWB 18 and the catcher 72 are released.

The method 1000 continues in response to a failure of the forward-aft oriented fuse pin, rotating the UWB from an operational position to a first position; contacting the one-piece underwing beam on a catcher in a catcher, and supporting the one-piece underwing beam with the catcher in a failsafe position, as in 1014. As shown in FIG. 7 and FIG. 8, as the forward-aft oriented fuse pin 66 fractures, the catcher bolts 82 that are common to the wingbox lug fitting flanges break and the UWB 18 continues to rotate down and push the catcher 72 further out with it.

The method 1000 continues by shearing secondary bolts securing a catcher to mating flanges depending from a plate engaged to fixed wing structure; releasing the catcher; and allowing the UWB to continue rotating, as in 1016. As shown in FIG. 7 and FIG. 8, as the forward-aft oriented fuse pin 66 fractures, the catcher bolts 82 that are common to the wingbox lug fitting flanges break and the UWB 18 continues to rotate down and push the catcher 72 further out with it. Also, as shown in FIG. 4C, the bolts 78 that secures the catcher 72 to the wingbox lug fitting 52 fractures as the UWB continues to rotate.

The method 1000 continues by rotating the UWB about rear spar attachment brackets, as in 1018. Continuing with the above example, the UWB 18 rotates about the attachment brackets 26 of the rear spar 24.

The method 1000 continues by reducing damage to an underside of a wing structure, rear spar and associated integral fuel cell by the attachment brackets remaining attached to the rear spar and the spherical bearing support assembly remaining attached to the fixed wing structure, as in 1020.

Examples of the present disclosure include, but are not limited to, the below listed clauses.

Clause 1. An underwing flap support mounting structure, comprising:
a one-piece underwing beam comprising an integral clevis at a forward end of the one-piece underwing beam and mounted to a lower skin of a wingbox, wherein the integral clevis comprises a first clevis bore and second clevis bore; and
a wingbox lug fitting comprising a wingbox lug and a spherical bearing support assembly carrying a race and a spherical bearing, the wingbox lug having a wingbox lug bore and the spherical bearing having a spherical bearing bore,
wherein a forward-aft oriented fuse pin is slidably received in the spherical bearing bore, the first clevis bore, and the second clevis bore to inhibit relative linear-vertical motion of the one-piece underwing beam and the integral clevis relative to a wingbox lug fitting that is mounted to the lower skin of the wingbox,
wherein a force applied to an aft portion of the underwing beam that is sufficient to urge separation from the wingbox creates a moment inducing the one-piece underwing beam to apply a shear force to enable the one-piece underwing beam and the integral clevis to pivot, shear the forward-aft oriented fuse pin, and enable the one piece underwing beam to become detached,
whereby the underwing beam separates from a wing without resulting damage to an underside of a wing structure.

Clause 2. The underwing flap support mounting structure of clause 1, further comprising attachment brackets attaching the one-piece underwing beam to a rear spar extending upward from the lower wing skin.

Clause 3. The underwing flap support mounting structure of clause 1 and/or clause 2, wherein the wingbox lug fitting comprising an attachment plate secured to the fixed wing structure.

Clause 4. The underwing flap support mounting structure of clauses 1-3, further comprising a catcher that extends from the wingbox lug fitting as a failsafe device to engage the one-piece underwing beam.

Clause 5. The underwing flap support mounting structure of clauses 1-4, wherein the catcher extends from the wingbox lug fitting by mating attachments.

Clause 6. The underwing flap support mounting structure of clauses 1-5, further comprising bolts engaging the mating attachments to constrain the catcher.

Clause 7. The underwing flap support mounting structure of clauses 1-6, wherein the moment further causes the one-piece underwing beam to continue to apply shear force inducing shearing of the forward-aft oriented fuse pin.

Clause 8. The underwing flap support mounting structure of clauses 1-7, wherein the attachment brackets are attached to the underwing beam with fasteners having permanent heads or frangible heads.

Clause 9. The underwing flap support mounting structure of clause 1-8, wherein the force further causes the underwing beam to rotate fracturing the frangible heads thereby releasing the underwing beam from attachment brackets.

Clause 10. The underwing flap support mounting structure of clauses 1-9, wherein a flap is attached to the underwing beam with one or more support links, said support links engaged proximate the aft portion of the underwing beam in an extended position of the flap whereby ground contact of the flap applies the force to the aft portion.

Clause 11. The underwing flap support mounting structure of clauses 1-10, wherein the wingbox is composed of a material comprising metal or carbon.

Clause 12. A method for separating an underwing flap support structure upon impact, the method comprising:
supporting a forward-aft oriented fuse pin extending from a lug in a spherical bearing;
engaging an integral clevis in a one-piece underwing beam on a forward end of an underwing beam mounted in a wing;
applying a force to an aft portion of the underwing beam that is sufficient to urge separation from the wing;
applying a shear force with the one-piece underwing beam to shear the forward-aft oriented fuse pin engaging the one-piece underwing beam and the integral clevis;
rotating the integral clevis of the underwing beam; and
releasing a forward end of the underwing beam for continued rotation.

Clause 13. The method of clause 12, further comprising:
in response to a failure of the forward-aft oriented fuse pin, rotating the underwing beam from an operational position to a first position;
contacting the one-piece underwing beam on a catcher; and
supporting the one-piece underwing beam with the catcher in a failsafe position.

Clause 14. The method of clause 12 and/or clause 13, further comprising:
shearing secondary bolts securing a catcher to mating flanges from a plate engaged to fixed wing structure;
releasing the catcher; and
allowing the underwing beam to continue rotate.

Clause 15. The method of clauses 12-14, further comprising rotating the underwing beam about rear spar attachment brackets.

Clause 16. The method of clauses 12-15, further comprising reducing damage to an underside of a wing structure, rear spar and associated integral fuel cell by the attachment brackets remaining attached to the rear spar and the spherical bearing support assembly remaining attached to the fixed wing structure.

Clause 17. The method of clauses 12-16, wherein a flap is attached to the underwing beam with one or more support links and further comprising: engaging the support links proximate the aft portion of the underwing beam in an extended position of the flap; and contacting the flap on a ground surface to apply the force to the aft portion.

Clause 18. An airplane comprising:
a wing;
an underwing flap support mounting structure mounted to the wing, wherein the underwing flap support mounting structure comprises:
a one-piece underwing beam comprising an integral clevis at a forward end of the one-piece underwing beam and mounted to a lower skin of a wingbox, wherein the integral clevis comprises a first clevis bore and second clevis bore; and
a wingbox lug fitting comprising a wingbox lug and a spherical bearing support assembly carrying a race and a spherical bearing, the wingbox lug having a wingbox lug bore and the spherical bearing having a spherical bearing bore,
wherein a forward-aft oriented fuse pin is slidably received in the spherical bearing bore, the first clevis bore, and the second clevis bore to inhibit relative linear-vertical motion of the one-piece underwing beam and the integral clevis relative to a wingbox lug fitting that is mounted to the lower skin of the wingbox,
wherein a force applied to an aft portion of the underwing beam that is sufficient to urge separation from the wingbox creates a moment inducing the one-piece underwing beam to apply a shear force to enable the one-piece underwing beam and the integral clevis to pivot, shear the forward-aft oriented fuse pin, and enable the one piece underwing beam to become detached,
whereby the underwing beam separates from the wing without resulting damage to an underside of a wing structure.

Clause 19. The airplane of clause 19, further comprising attachment brackets attaching the one-piece underwing beam to a rear spar extending upward from the lower wing skin.

Clause 20. The airplane of clause 18 and/or clause 19, wherein the moment further causes the one-piece underwing beam to continue to apply shear force inducing shearing of the forward-aft oriented fuse pin.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The following embodiments are described for illustrative purposes only with reference to the Figures. Those of skill in the art will appreciate that the following description is exemplary in nature, and that various modifications to the parameters set forth herein could be made without departing from the scope of the present embodiments. It is intended that the specification and examples be considered as examples only. The various embodiments are not necessarily mutually exclusive, as some embodiments can be combined with one or more other embodiments to form new embodiments.

While the embodiments have been illustrated respect to one or more implementations, alterations and/or modifications can be made to the illustrated examples without departing from the spirit and scope of the appended claims. In addition, while a particular feature of the embodiments may have been disclosed with respect to only one of several implementations, such feature may be combined with one or more other features of the other implementations as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of A, B and C.

Other embodiments will be apparent to those skilled in the art from consideration of the specification and practice of the descriptions disclosed herein. It is intended that the specification and examples be considered as exemplary only, with a true scope and spirit of the embodiments being indicated by the following claims.

What is claimed is:

1. An underwing flap support mounting structure, comprising:
a one-piece underwing beam comprising an integral clevis at a forward end of the one-piece underwing beam and mounted to a lower skin of a wingbox, wherein the integral clevis comprises a first clevis bore and second clevis bore; and
a wingbox lug fitting comprising a wingbox lug and a spherical bearing support assembly carrying a race and a spherical bearing, the wingbox lug having a wingbox lug bore and the spherical bearing having a spherical bearing bore,
wherein a forward-aft oriented fuse pin is slidably received in the spherical bearing bore, the first clevis bore, and the second clevis bore to inhibit relative linear-vertical motion of the one-piece underwing beam and the integral clevis relative to a wingbox lug fitting that is mounted to the lower skin of the wingbox,
wherein a force applied to an aft portion of the underwing beam that is sufficient to urge separation from the wingbox creates a moment inducing the one-piece underwing beam to apply a shear force to enable the one-piece underwing beam and the integral clevis to pivot, shear the forward-aft oriented fuse pin, and enable the one piece underwing beam to become detached,
whereby the underwing beam separates from a wing without resulting damage to an underside of a wing structure.

2. The underwing flap support mounting structure of claim 1, further comprising attachment brackets attaching the one-piece underwing beam to a rear spar extending upward from the lower wing skin.

3. The underwing flap support mounting structure of claim 2, wherein the attachment brackets are attached to the underwing beam with fasteners having permanent heads or frangible heads.

4. The underwing flap support mounting structure of claim 3, wherein the force further causes the underwing beam to rotate fracturing the frangible heads thereby releasing the underwing beam from attachment brackets.

5. The underwing flap support mounting structure of claim 1, wherein the wingbox lug fitting comprising an attachment plate secured to a fixed wing structure.

6. The underwing flap support mounting structure of claim 5, further comprising a catcher that extends from the wingbox lug fitting as a failsafe device to engage the one-piece underwing beam.

7. The underwing flap support mounting structure of claim 6, wherein the catcher extends from the wingbox lug fitting by mating attachments.

8. The underwing flap support mounting structure of claim 7, further comprising bolts engaging the mating attachments to constrain the catcher.

9. The underwing flap support mounting structure of claim 1, wherein the moment further causes the one-piece underwing beam to continue to apply shear force inducing shearing of the forward-aft oriented fuse pin.

10. The underwing flap support mounting structure of claim 1, wherein a flap is attached to the underwing beam with one or more support links, said support links engaged proximate the aft portion of the underwing beam in an extended position of the flap whereby ground contact of the flap applies the force to the aft portion.

11. The underwing flap support mounting structure of claim 1, wherein the wingbox is composed of a material comprising metal or carbon.

12. A method for separating an underwing flap support structure upon impact, the method comprising:
supporting a forward-aft oriented fuse pin extending from a lug in a spherical bearing;
engaging an integral clevis in a one-piece underwing beam on a forward end of an underwing beam mounted in a wing, wherein the integral clevis comprises a first clevis bore and a second clevis bore and wherein the forward-aft oriented fuse pin is slidably received in the spherical bearing bore, the first clevis bore, and the second clevis bore;
applying a force to an aft portion of the underwing beam that is sufficient to urge separation from the wing;
applying a shear force with the one-piece underwing beam to shear the forward-aft oriented fuse pin engaging the one-piece underwing beam and the integral clevis;
rotating the integral clevis of the underwing beam; and
releasing a forward end of the underwing beam for continued rotation.

13. The method of claim 12, further comprising:
in response to a failure of the forward-aft oriented fuse pin, rotating the underwing beam from an operational position to a first position;
contacting the one-piece underwing beam on a catcher; and
supporting the one-piece underwing beam with the catcher in a failsafe position.

14. The method of claim 13, further comprising:
shearing secondary bolts securing a catcher to mating flanges from a plate engaged to a wingbox lug fitting;
releasing the catcher; and
allowing the underwing beam to continue rotate.

15. The method of claim 14, further comprising rotating the underwing beam about rear spar attachment brackets.

16. The method of claim 15, further comprising reducing damage to an underside of a wing structure, rear spar and associated integral fuel cell by the attachment brackets remaining attached to the rear spar and the spherical bearing support assembly remaining attached to a fixed wing structure.

17. The method of claim 12, wherein a flap is attached to the underwing beam with one or more support links and further comprising: engaging the support links proximate the aft portion of the underwing beam in an extended position of the flap; and contacting the flap on a ground surface to apply the force to the aft portion.

18. An airplane comprising:
a wing;
an underwing flap support mounting structure mounted to the wing, wherein the underwing flap support mounting structure comprises:
a one-piece underwing beam comprising an integral clevis at a forward end of the one-piece underwing beam and mounted to a lower skin of a wingbox, wherein the integral clevis comprises a first clevis bore and second clevis bore; and
a wingbox lug fitting comprising a wingbox lug and a spherical bearing support assembly carrying a race and a spherical bearing, the wingbox lug having a wingbox lug bore and the spherical bearing having a spherical bearing bore,
wherein a forward-aft oriented fuse pin is slidably received in the spherical bearing bore, the first clevis bore, and the second clevis bore to inhibit relative linear-vertical motion of the one-piece underwing beam and the integral clevis relative to a wingbox lug fitting that is mounted to the lower skin of the wingbox,
wherein a force applied to an aft portion of the underwing beam that is sufficient to urge separation from the wingbox creates a moment inducing the one-piece underwing beam to apply a shear force to enable the one-piece underwing beam and the integral clevis to pivot, shear the forward-aft oriented fuse pin, and enable the one piece underwing beam to become detached,
whereby the underwing beam separates from the wing without resulting damage to an underside of a wing structure.

19. The airplane of claim 18, further comprising attachment brackets attaching the one-piece underwing beam to a rear spar extending upward from the lower wing skin.

20. The airplane of claim 18, wherein the moment further causes the one-piece underwing beam to continue to apply shear force inducing shearing of the forward-aft oriented fuse pin.

* * * * *